United States Patent

Tunney et al.

[11] Patent Number: 5,122,436
[45] Date of Patent: Jun. 16, 1992

[54] CURABLE COMPOSITION

[75] Inventors: Scott E. Tunney, Ontario; John J. Fitzgerald, Webster, both of N.Y.

[73] Assignee: Eastman Kodak Company, Rochester, N.Y.

[21] Appl. No.: 514,776

[22] Filed: Apr. 26, 1990

[51] Int. Cl.$^5$ .............................................. G03F 7/075
[52] U.S. Cl. .................... 430/288; 430/906; 430/281; 522/142; 525/426
[58] Field of Search ................ 525/426; 522/142; 430/906

[56] References Cited

U.S. PATENT DOCUMENTS

| | | | |
|---|---|---|---|
| 3,620,736 | 11/1971 | Tarkington | 96/36 |
| 3,748,133 | 7/1973 | Noonan et al. | 96/35.1 |
| 4,147,552 | 4/1979 | Specht et al. | 96/115 R |
| 4,247,623 | 1/1981 | Guild | 430/275 |
| 4,289,844 | 9/1981 | Specht et al. | 430/281 |
| 4,342,151 | 8/1982 | Guild | 430/288 X |
| 4,499,149 | 2/1985 | Berger | 428/447 |
| 4,670,497 | 6/1987 | Lee | 525/426 X |
| 4,727,126 | 2/1988 | Chen | 526/302 |
| 4,767,883 | 8/1988 | Molaire | 560/220 |
| 4,803,147 | 2/1989 | Mueller et al. | 430/288 |
| 4,853,452 | 8/1989 | Lee | 525/426 X |
| 4,996,278 | 2/1991 | Lee | 525/426 X |

OTHER PUBLICATIONS

Summers et al, Polymer Preprints 27, 403–405 (1986).
Yilgor et al, Polysiloxane Containing Polymers: A Survey of Recent Developments in "Polysiloxane Copolymers/Anionic Polymerization" Springer-Verlag, Berlin, W.Ger. (1988).
Iskender Vilgor, Polymer Sci. Tech. 37 Adhesives: Sealants, Coatings, Space Harsh Environment, pp. 249–264 (1988).

*Primary Examiner*—Cynthia Hamilton
*Attorney, Agent, or Firm*—Robert Luke Walker

[57] ABSTRACT

A curable composition which comprises a homogeneous blend of (a) a solvent soluble polyimidesiloxane containing about 0.2–30 weight percent silicon and (b) an ethylenically unsaturated multifunctional monomer. The siloxane units in the polyimide-siloxane have from 10 to about 200

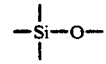

linkages per unit, more preferably from about 15 to about 100 linkages, and most preferably from about 40 to about 60

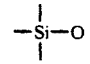

linkages per siloxane unit. Another embodiment provides the composition produced by curing the above-described composition. The curable compositions of this invention can be cured by either actinic radiation, e.g., uv light, or thermal radiation. In the cured composition, the polymer produced upon polymerization of the monomer, and the polyimide portion of the polyimide-siloxane form a homogeneous blend, in which the siloxane portion of the polyimide-siloxane is phase separated. The cured composition is a polymer network, and is particularly useful as a negative-working resist in the fabrication of electronic devices such as integrated circuit (IC) chips. The cured composition reduced stress at the polymer/metal interface of coated objects, thereby reducing curl in thin, coated objects.

12 Claims, No Drawings

CURABLE COMPOSITION

CROSS REFERENCE TO RELATED APPLICATION

Reference is hereby made to commonly-assigned U.S. patent application Ser. No. 07/514,814 now U.S. Pat. No. 5,098,814 entitled LAMINATE FOR THE FORMATION OF BEAM LEADS FOR IC CHIP BONDING filed in the names of S. E. Tunney and J. J. Fitzgerald concurrently herewith.

FIELD OF THE INVENTION

This invention relates to curable/imageable compositions particularly useful as negative-working resists in the fabrication of electronic devices. This invention also relates to the compositions produced upon curing the curable mixtures. The compositions comprise a polyimide-siloxane and an ethylenically unsaturated monomer, or monomers or the polymer produced from the monomer(s).

BACKGROUND OF THE INVENTION

Polyimides are widely used in the electronic packaging industry because of their high glass transition temperature, excellent thermal and hydrolytic stability, and chemical resistance. Most polyimides are prepared by a two-step process in which a diamine is condensed with a dianhydride to form a polyamic acid, which is dehydrated to form the polyimide by thermal or chemical methods. Since polyimides are generally insoluble in organic solvents, it is difficult to fabricate electronic package with them. In general, the soluble polyamic acid is coated onto a substrate, and then subjected to high temperatures and long bake times (or chemicals) to complete the imidization process. Such methods are not entirely satisfactory. For example, they hold up the production rate by requiring separate processing steps. In addition, many of the polyimides formed have a thermal coefficient of expansion (TCE) which is not optimum. Also, in these prior art methods, there is a substantial amount of shrinkage. This leads to curling or other manifestation of stress at the coating/substrate interface. For example, in the electronic packaging industry Kapton TM resin, a polyimide commercialized by DuPont, is widely used as a dielectric layer. Kapton resin has good resistance to chemical attack, excellent thermal stability (>400° C.), and low dielectric constant. However, Kapton resin is not processible in its imidized form, and consequently it is made available as either an insoluble film or as a soluble precursor, e.g., the polyamic acid in N-methylpyrollidone. Unfortunately, the TCE of Kapton polyimide ($35 \times 10^{-6}/°C.$) in the XY plane is larger than the TCE of materials used in the electronics industry such as silicon and copper. The high TCE and high modulus leads to stress at the polymer-metal interface and, therefore, Kapton resin forms materials having less than optimum properties.

For example, stress at the polymer/metal interface can cause curl in coated objects. Curl can be an extremely detrimental problem in devices which must remain substantially flat. For example, in IC chip bonding, if the extent of curl is too high, not all beam leads will become attached to the chip; and consequently the chip may not perform as intended.

Consequently, a need exists for provision of coating materials which have the desirable properties of polyimides, but which substantially obviate the problems (e.g., curl) associated with stress at the resin/metal interface. This invention satisfies that need.

RELATED ART

There is no literature precedent for the compositions of this invention. Mueller et al, U.S. Pat. No. 4,803,147, teaches incorporation of siloxanes into polyimides for preparation of photosensitive polyimide polymer compositions. However, the Mueller compositions are limited to siloxanes which have up to eight

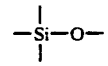

linkages in a unit. Such units are different from the larger siloxane units employed in this invention since the siloxanes of the Mueller's compositions do not phase separate in the manner that the siloxane of this invention is phase separated from the polyimide. Hence, Mueller et al does not disclose the materials of this invention, and the compositions of the type suggested by Mueller et al do not have all of the valuable properties of the materials made available by this invention.

SUMMARY OF THE INVENTION

This application pertains to polyimide-siloxane containing compositions which reduce stress at the metal/polymer interface, and thereby reduce such in thin, coated objects. More particularly, this invention provides a curable composition capable of forming a semi-interpenetrating network-II on curing, said composition comprising a homogeneous mixture of:

(a) a solvent soluble linear polyimide-siloxane having from 0.5 to about 30 weight percent silicon, said silicon being in siloxane units in said polyimide-siloxane, said siloxane units having from about 10 to about 200

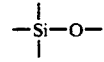

units per unit, and (b) at least one ethylenically unsaturated multifunctional monomer; the relative concentration of (a) and (b) being such that said mixture provides a homogeneous blend of
  (i) the polyimide portion of said polyimide-siloxane and
  (ii) the polymer produced from said monomer upon curing, in which said siloxane portion of said polyimide-siloxane is phase separated.

In another embodiment, this invention also provides the compositions produced upon curing the compositions discussed above.

As stated above, this invention provides compositions which obviate or substantially reduce the amount of stress at the metal/polymer interface in laminates. The curable compositions of this invention comprise a polyimide-siloxane as a binder. The binders are hydrolytically stable, have low dielectric constants, and dielectric properties which are relatively insensitive to changes in humidity and temperature. In addition, the binders have good chemical resistance and thermal properties. The polyimide component of the polyimide-siloxane also has appreciable solubility in a number of common organic solvents. In addition, the binders have suitable physical and mechanical properties such as glass transition temperature, Young's modulus, and elongation to break. The polyimide component of the polyimide-siloxane also has suitable compatibility with the ethylenically unsaturated multifunctional monomer(s) used in a photoimageable dielectric formation.

The curable compositions of this invention comprise a polyimide-siloxane of the type discussed above and described in more detail below. The curable compositions also comprise an ethylenically unsaturated monomer which is capable of being polymerized upon activation and exposure to actinic and/or thermal radiation. In addition to the unsaturated monomer and the polyimide-siloxane, the curable compositions may contain other ingredients such as photoinitiators, stabilizers, fillers, and the like.

The utility of the above-described blend in uv-curable and imageable compositions is due at least partly to its ability to form a semi-interpenetrating polymer network-II upon curing. As is well known to those skilled in the art, interpenetrating polymer networks (IPNs) contain at least two polymers, in which at least one forms a network. Specifically, in a semi-interpenetrating polymer network-II (semi-IPN-II), the first polymer is linear and a second polymer is polymerized in its presence and forms a cross-linked network. As used herein, the term "semi-interpenetrating polymer network-II" is intended to mean a polymer network including a first polymer in linear form and a second polymer in cross-linked network form. Semi-IPNs-II and IPNs are described in further detail in *Interpenetrating Polymer Networks and Related Materials* by L. H. Sperling, Lehigh University, Bethlehem, Pennsylvania, Plenum Press (1980).

The compositions of this invention provide good clean-out of uncured areas with common developing solvents, improved thermal and mechanical properties of developed patterns after curing, low moisture sensitivity and excellent hydrolytic stability and thus are particularly useful as resists in the fabrication of electronic devices.

The compositions of the invention can be coated onto any suitable rigid or flexible support, imagewise exposed to actinic radiation, developed in any suitable solvent, and further cured, as desired. They are particularly suitable for preparing laminates for the manufacture of frames of metal beam leads to be bonded to integrated circuit chips in which a metal strip contains a layer of a first resist adhered to one surface and a layer of the resist of the invention adhered to the opposite surface.

The compositions of the invention can be used as uv-curable imageable coatings as described, for example, in U.S. Pat. No. 3,469,982, which is hereby incorporated by reference for all that it discloses. They are particularly useful for the manufacture of printed circuit boards and beam leads.

During the course of work conducted in the development of this invention, the inventors demonstrated that it is not sufficient to merely match the TCE's of a metal such as copper, and the polyimide, in order to reduce stress at a metal/polymer interface. Because of volume shrinkage that occurs during the imidization process and solvent removal, a considerable amount of curl still occurs in the laminate. In addition, the low TCE polyimides are insoluble and brittle, and therefore they would be difficult to use in electronic packaging applications.

In contrast to the unsatisfactory results discussed above, the inventors were able to substantially reduce curl even with a polyimide-siloxane which has a much higher TCE than the metal. It was found that the siloxane modified compositions of this invention had two distinct glass transition temperatures by dynamic mechanical analysis. In these compositions, there is a substantial reduction of Young's modulus, and this reduces the curl to a substantial degree. The presence of the two glass transistion temperatures clearly demonstrates that the siloxane portion is phase separated from the polyimide portion of the polyimide-siloxane. However, the second glass transition temperature is slightly lower than the Tg for the parent polyimide, indicating that there is a minor amount of mixing occurring which results in depression of the Tg of the polyimide phase.

DESCRIPTION OF PREFERRED EMBODIMENTS

This invention relates to two types of compositions, and to a process for forming one of them. The first type of composition, i.e., Composition (1), comprises an ethylenically unsaturated monomer and a solvent soluble, linear, polyimide-siloxane having from about 0.5 to about 30 weight percent silicon. The silicon is contained in siloxane units which are chemically attached to the polyimide portion of the polymer. The siloxane units have at least about 10, and more preferably at least about 15

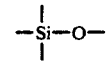

units in a chain.

Because of the presence of the ethylenically unsaturated monomer, Composition (1) materials are curable. The Composition (2) materials are formed by curing Composition (1) materials.

Composition (2) mixtures comprise a semi-interpenetrating polymer network-II prepared by curing Composition (1). In Composition (2), the polymer produced upon curing the ethylenically unsaturated monomer and the polyimide portion of the polyimide-siloxane are miscible. For the purpose of this invention, miscibility is determined by optical clarity of the coating to visible light and a single glass transition temperature (Tg) of the polyimide/polymer (e.g. the polymer produced upon curing the ethylenically unsaturated monomer). The siloxane portion is phase separated from the polyimide/ethylenically unsaturated monomer and the polyimide/polymer (i.e., the polymer produced upon curing the ethylenically unsaturated monomer) portion. Hence the compositions are heterogeneous. Composition (2) may also contain fillers and/or other addenda, depending on whether such materials were added to Composition (1) before curing.

The curable compositions of this invention include a binder comprising a polyimide-siloxane. The polyimide-siloxanes useful in the practice of the invention are linear and solvent soluble. By "linear" it is meant that the polyimide-siloxane consists essentially of recurring units containing cyclic imide and siloxane units in the polymer backbone, and that such recurring units are present essentially in the form of long chains. The polyimide must be essentially free of pendant unsaturation.

By "solvent soluble" it is meant that the polyimide-siloxane must be at least slightly soluble in organic solvents, e.g., 1,1,1-trichloroethane, methylene chloride, or other common organic solvents, examples of which include the following:

N,N-dimethylformamide,
N,N-dimethylacetamide,
N-methyl-2-pyrrolidone,
N,N-diethylformamide,
N,N-diethylacetamide,
N-methylcaprolactam,
dioxane,
dimethylsulfoxide,
tetramethylurea,
pyridine,
dimethylsulfone,
hexamethylphosphoramide,
tetramethylene sulfone,
formamide,
N-methylformamide,
γ-butyrolactone,
tetrahydrofuran,
m-cresol,
2-methoxyethyl acetate,
1,2-dimethoxyethane,
bis(2-methoxyethyl)ether,
chloroform,
chlorobenzene,
cyclohexanone and
nitrobenzene.

The solvents can be used alone, in combinations, or in combination with so-called poor solvents such as benzene, benzonitrile, xylene, toluene and cyclohexane. More specifically, by "slightly soluble" it is meant that the polyimide-siloxane is soluble in an amount of at least about 1%, more preferably 10-20% or more by weight in the selected solvent.

A preferred class of solvent soluble linear polyimide-siloxanes includes those polyimide-siloxanes derived from phenylindane diamines and dianhydrides described in U.S. Pat. No. 3,856,752, the disclosure of which is hereby incorporated by reference in its entirety. These polyimides are characterized by phenylindane diamines and/or dianhydrides incorporated into the polyimide backbone.

Particularly preferred polyimides contain recurring units having the structural formula:

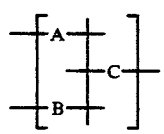
(I)

wherein A is selected from a phenylindane radical having the structural formula

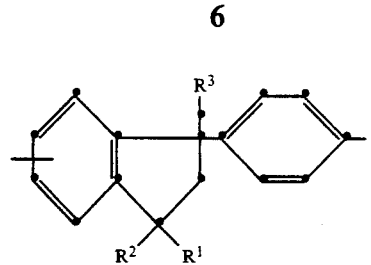
(II)

wherein $R^1$, $R^2$ and $R^3$ are individually H or an alkyl group preferably containing from 1 to 5 carbon atoms; or a group having the structural formula

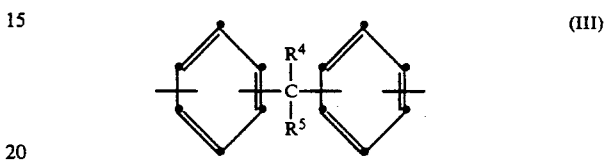
(III)

wherein $R^4$ and $R^5$ are individually H, alkyl of from 1 to 5 carbon atoms or fluoroalkyl, the alkyl portion of which preferably contains from 1 to 5 carbon atoms. In Formula (I), B is a group having the structural formula

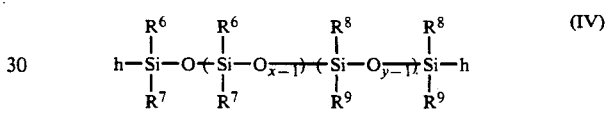
(IV)

wherein each h is a linking group independently selected from alkyl and fluoroalkyl groups having up to about 5 carbon atoms, and aryl groups having up to about 10 carbon atoms. Preferably, both h radicals are the same. It is also preferred that the perfluoroalkyl groups have the formula $-(CH_2)_n CF_3$ wherein n has a value of from 0 to about 4. When h is an aryl group, it may be a phenyl radical, an alkyl substituted phenyl radical, or a naphthyl radical.

In Formula (IV), $R^6$, $R^7$, $R^8$ and $R^9$ are selected from alkyl, aryl, and fluoroalkyl groups of the type referred to above. The values of x and y are each from 0 to about 200, such that the value of $(x+y)$ is from 10 to about 200, more preferably from about 15 to about 200, and even more preferably from about 40 to about 60.

In the Formula (I), C can be selected from a group having the structural formula

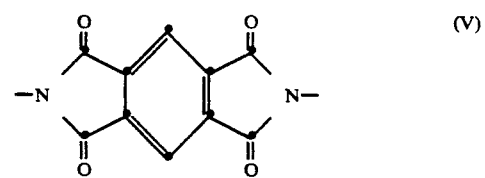
(V)

or

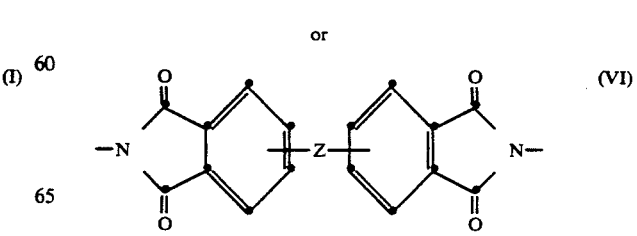
(VI)

wherein Z is

Representative species of highly preferred polyimide-siloxanes which have been found to be useful in the practice of this invention include

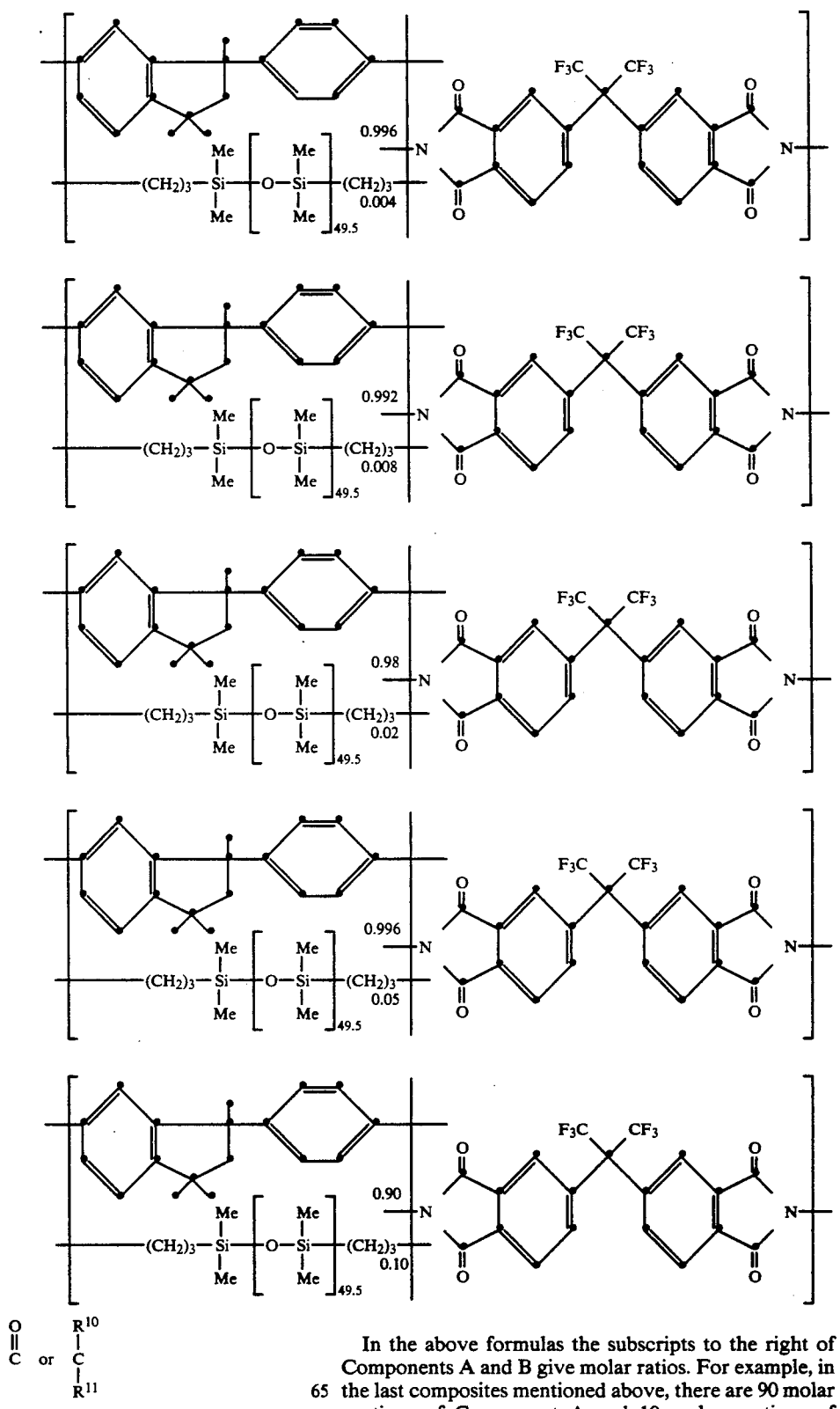

$$\overset{O}{\underset{C}{\parallel}} \quad \text{or} \quad \overset{R^{10}}{\underset{\underset{R^{11}}{|}}{\overset{|}{C}}}$$

wherein $R^{10}$ and $R^{11}$ are H, alkyl or fluoroalkyl, and wherein said fluoroalkyl groups are as discussed above.

In the above formulas the subscripts to the right of Components A and B give molar ratios. For example, in the last composites mentioned above, there are 90 molar portions of Component A and 10 molar portions of Component B. Linear polyimides useful in the practice of this invention can be derived from a variety of diamines and dianhydrides. The diamines that can be employed in the preparation of the polyimides useful herein include the phenylindane diamines described in U.S. Pat. No. 3,856,752, examples of which include, 5-amino-1-(4'-aminophenyl)-1,3,3-trimethylindane, 6-amino-1-(4'-aminophenyl)-1,3,3-trimethylindane, optionally substituted with alkyl, halogen or fluoroalkyl, and aromatic diamines, for example,
4,4'-methylenebis(o-chloroaniline),
3,3'-dichlorobenzidine,
3,3'-sulfonyldianiline,
4,4'-diaminobenzophenone,
1,5-diaminonaphthalene,
bis(4-aminophenyl)diethyl silane,
bis(4-aminophenyl)diphenyl silane,
bis(4-aminophenyl)ethyl phosphine oxide,
N-(bis(4-aminophenyl))N-methyl amine,
N-(bis(4-aminophenyl))N-phenyl amine,
4,4'-methylenebis(2-methylaniline),
4,4'-methylenebis(2-methoxyaniline),
5,5'-methylenebis(2-aminophenol),
4,4'-methylenebis(2-methylaniline),
4,4'-oxybis(2-methoxyaniline),
4,4'-oxybis(2-chloroaniline),
2,2'-bis(4-aminophenol),
5,5'-oxybis(2-aminophenol),
4,4'-thiobis(2-methylaniline),
4,4'-thiobis(2-methoxyaniline),
4,4'-thiobis(2-chloroaniline),
4,4'-sulfonylbis(2-methylaniline),
4,4'-sulfonylbis(2-ethoxyaniline),
4,4'-sulfonylbis(2-chloroaniline),
5,5'-sulfonylbis(2-aminophenol),
3,3'-dimethyl-4,4'-diaminobenzophenone,
3,3'-dimethoxy-4,4'-diaminobenzophenone,
3,3'-dichloro-4,4'-diaminobenzophenone,
4,4'-diaminobiphenyl,
m-phenylenediamine,
p-phenylenediamine,
4,4'-methylenedianiline,
4,4'-oxydianiline,
4,4'-thiodianiline,
4,4'-sulfonyldianiline,
4,4'-isopropylidenedianiline,
3,3'-dimethylbenzidine,
3,3'-dimethoxybenzidine,
3,3'-dicarboxybenzidine and
diaminotoluene.

Aromatic polyimides for this invention can also be made from the benzhydrols disclosed in U.S. Pat. No. 4,736,015. Siloxane diamines for the preparation of polyimide-siloxanes for this invention can be selected from appropriate materials in U.S. Pat. No. 4,499,149.

Dianhydrides that can be employed in the preparation of the polyimides useful herein include the dianhydrides described in U.S. Pat. No. 3,856,752, examples of which include phenylindane dianhydrides, such as
1-(3',4'-dicarboxyphenyl)-1,3,3-trimethylindane-5,6-dicarboxylic acid dianhydride,
1-(3',4'-dicarboxyphenyl)-1,3,3-trimethylindane-6,7-dicarboxylic acid dianhydride,
1-(3',4'-dicarboxyphenyl)-3-methylindane-5,6-dicarboxylic acid dianhydride,
1-(3',4'-dicarboxyphenyl)-3-methylindane-6,7-dicarboxylic acid dianhydride,
and other dianhydrides, preferably aromatic dianhydrides or tetracarboxylic acid dianhydrides, such as
2,3,9,10-perylene tetracarboxylic acid dianhydride,
1,4,5,8-naphthalene tetracarboxylic acid dianhydride,
2,6-dichloronaphthalene-1,4,5,8-tetracarboxylic acid dianhydride,
2,7-dichloronaphthalene-1,4,5,8-tetracarboxylic acid dianhydride,
2,3,6,7-tetrachloronaphthalene-1,4,5,8-tetracarboxylic acid dianhydride,
phenanthrene-1,8,9,10-tetracarboxylic acid dianhydride,
2,3,3',4'-benzophenonetetracarboxylic acid dianhydride,
pyromellitic dianhydride,
3,3',4,4'-benzophenonetetracarboxylic acid dianhydride,
2,2',3,3'-benzophenonetetracarboxylic acid dianhydride,
3,3',4,4'-biphenyltetracarboxylic acid dianhydride,
2,2',3,3'-biphenyltetracarboxylic acid dianhydride,
4,4'-isopropylidenediphthalic anhydride,
3,3'-isopropylidenediphthalic anhydride,
4,4'-oxydiphthalic anhydride,
4,4'-sulfonyldiphthalic anhydride,
3,3'-oxydiphthalic anhydride,
4,4'-methylenediphthalic anhydride,
4,4'-thiodiphthalic anhydride,
4,4-ethylidenediphthalic anhydride,
2,3,6,7-naphthalenetetracarboxylic acid dianhydride,
1,2,4,5-naphthalenetetracarboxylic acid dianhydride,
1,2,5,6-naphthalenetetracarboxylic acid dianhydride,
benzene-1,2,3,4-tetracarboxylic acid dianhydride,
pyrazine-2,3,5,6-tetracarboxylic acid dianhydride and
thiophene-2,3,4,5-tetracarboxylic acid dianhydride.

The diamines, diaminosiloxanes, and dianhydrides described above are known compounds and/or can be prepared by one skilled in the art by known procedures.

The above-described solvent soluble polyimide-siloxanes useful in the practice of this invention are known and/or can be prepared by techniques well known to those skilled in the art. For example, the polyimide-siloxanes can be prepared by reacting diamines with dianhydrides in an organic reaction medium such as described in U.S. Pat. No. 3,856,752 cited above to form a polyamic acid which is subsequently converted to the polyimide by known techniques, for example, by chemical and/or thermal methods. An illustrative preparation is set forth below. Polyimide-siloxanes useful herein can also be prepared by reacting a diisocyanate with a dianhydride such as described in U.S. Pat. No. 3,708,458.

The composition of this invention includes at least one polymerizable multifunctional monomer. A preferred class of multifunctional monomers is multifunctional acrylates. Useful acrylates include diacrylates, triacrylates, tetraacrylates, pentaacrylates, hexaacrylates, and the like. Exemplary preferred species include
1,6-hexanediol diacrylate,
neopentyl glycol diacrylate,
ethylene glycol diacrylate,
diethylene glycol diacrylate,
polyethylene glycol diacrylate,
pentaerythritol triacrylate,
1,2,4-butanetriol triacrylate,
trimethylolpropane triacrylate,
glycerol triacrylate,
tetramethylolmethane tetraacrylate,
tetraethylene glycol diacrylate,
nonaethylene glycol diacrylate,
methylene diacrylate, ethylene diacrylate
pentaerythritol diacrylate, glycerol diacrylate,
1,3-propylene diacrylate,
1,3-propylene glycol diacrylate,
1,5-pentanediol diacrylate,
dipentaerythritol hexaacrylate,
1,4-benzenediol diacrylate,
1,4-cyclohexane diacrylate,
1,4-cyclohexane dimethanol diacrylate, and
tris(acryloyloxyethyl)-1,2,4-benzenetricarboxylate.

A particularly preferred class of diacrylates comprises 1,4-cyclohexylene bis(oxyalkyl) diacrylates, for example,
1,4-cyclohexylenebis (oxymethyl) diacrylate,
1,4-cyclohexylenebis (oxyethyl) diacrylate,
1,4-cyclohexylenebis (oxypropyl) diacrylate,
1,4-cyclohexylenebis (oxybutyl) diacrylate,
1,4-cyclohexylenebis (oxypentyl) diacrylate and
1,4-cyclohexylenebis (oxyhexyl) diacrylate.

These monomers can be prepared by reacting acryloyl (or methacryloyl) chloride with an hydroxy alkoxycyclohexane as described in U.S. Pat. No. 4,767,883.

Other useful multifunctional acrylates include
bis(4-acryloyloxybutyl)terephthalate,
bis(acryloyloxypropyl)terephthalate,
1,3-cyclohexanedimethanol diacrylate,
bis(2-acryloyloxyethyl)isophthalate,
bis(2-acryloyloxyethyl)terephthalate,
1,4-bis(2-acryloyloxyethoxy)benzene,
1,4-bis(2-acryloyloxyethoxy)cyclohexane dicarboxylate,
1,3-bis(2-acryloyloxyethoxy)benzene,
bis(4-acryloyloxybutyl)isophthalate and
bis(acryloyloxypropyl)isophthalate.

Other useful polymerizable multifunctional monomers include multifunctional acrylamides such as xylene-bis(acrylamide) and alkylene(bis-acrylamides) where alkylene preferably contains 1 to 8 carbon atoms.

Of course, any of the above monomers can be substituted with methacryl in place of the acryl.

In preferred embodiments, the polyimide portion of the polyimide-siloxane contains the phenylindane nucleus and/or an

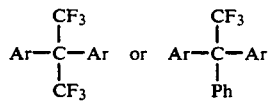

group group (Ph=phenyl) in the polyamic and/or diamine portion of the molecule. The phenylindane nucleus and the groups depicted above confer solubility on the polyimide and/or hydrolytic stability.

In preferred embodiments, the polyimide is modified with a siloxane by reacting the polyamic acid with a diamine having the formula

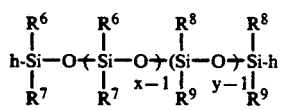

wherein x and y have the same significance as above, $R^6$, $R^7$, and $R^8$, and $R^9$ are selected from from (—$CH_3$) or phenyl (—Ph), and $R^7$ is selected from methyl, phenyl, and 3,3,3-trifluoropropyl. Siloxanes with such groups are comparatively readily available. Furthermore, the presence of phenyl groups confers thermal stability. The methyl and trifluoropropyl groups confer flexibility. By selection of the number of phenyl, methyl, and trifluoropropyl groups, the practitioner can, at least within some extent, tailor the molecule to possess desired degrees of thermal stability and flexibility.

In the siloxane reactant, each h may be alike or different. Preferably both linking groups illustrated by the symbol h are the same. The groups indicated by h may be selected from lower alkylene groups such as methylene, —$CH_2$—, or higher homologs thereof, $-(CH_2)_n-$, wherein n is up to about 5, or the phenyl group. Siloxane reactants with such alkylene groups are preferred because they are more readily available. However, when thermal stability is highly desired, it is preferred that both h groups are phenyl.

Of the ethylenically unsaturated monomers which are useful in this invention, acrylates are preferred. Preferred acrylates are relatively thermally stable and non-crystalline. Such acrylates have an aryl group and also an aliphatic component. Illustrative acrylates of this type are illustrated by the following wherein R is a cyclohexyl group,

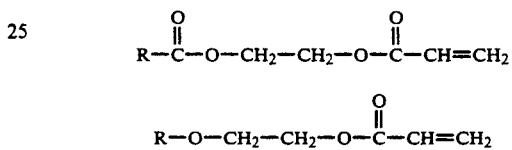

Examples of acrylates of this type are named above. Such materials are disclosed in above-cited U.S. Pat. No. 4,767,833 wherein they are illustrated by the formula:

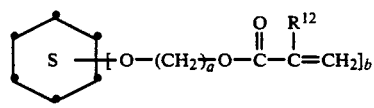

wherein
$R^{12}$ is H or $CH_3$
a is an integer of from 1 to 10 and
b is 1 or 2.

In an even more preferred embodiment, the cyclohexyl group R is replaced by an aryl group; preferably disubstituted or trisubstituted phenyl radicals wherein the substituents are acryloyloxyalkyl groups of the type mentioned above.

Coating composition of the above-described blends in any suitable solvent can be employed to apply the blends for any desired end use. Some suitable solvents include dichloromethane, acetone, benzene, acetates, alcohols, ethers, toluene, 1,1,1-trichloroethane, ethyl-3-ethoxypropionate, ethyl-3-methoxypropionate, 1-methoxy-2-propyl propionate, 1-methoxy-3-propyl acetate, 1-ethoxy-2-propyl acetate, 2-ethoxyethyl acetate, 2-methoxyethanol, 2-ethoxyethanol, propylene glycol monomethyl ether acetate, 2-methoxyethyl acetate chlorobenzene, cyclohexanone and the like and mixtures thereof.

The compositions can be applied by any suitable method including spray coating, swirl coating, curtain coating, and the like conventional methods, either to a support film prior to application or to the substrate surface on which it is to be cured. The support can be rigid or flexible.

The compositions can be cured by heating or by exposure to uv or other activating radiation. Any suitable apparatus using any suitable solvent that will remove cured resist can be used to develop the image after exposure. Some suitable solvents include 1,1,1-trichloroethane, trichloromethane, acetone, benzene, toluene, alcohols, ethers, and the like and mixtures thereof.

The composition of the invention can include a photoinitiator which increases the speed of the composition. Any free-radical generating photoinitiator system can be used which initiates polymerization of the polymerizable monomer and does not subsequently terminate the polymerization. The free-radical generating photoinitiator system can comprise one or more compounds which directly furnish free radicals when activated by radiation. It can also comprise a plurality of compounds one of which yields free radicals after having been caused to do so by a sensitizer which is activated by the radiation.

Representative useful examples of such photoinitiators include, for example, those described in British Patent No. 1,507,704, including benzophenone, acetophenone, ethyl methyl ketone, cyclopentanone, benzil, caprone, benzoyl cyclobutanone, and dioctyl acetone, particularly when used in admixture with substituted benzophenones such as Michler's ketone.

Highly preferred as the photoinitiator is a mixture of 3-ketocoumarin and an amine such as is described in U.S. Pat. No. 4,289,844. Representative amines include
ethyl-p-dimethylaminobenzoate,
other esters of p-dimethylaminobenzoic acid, e.g.,
n-butyl-p-dimethylaminobenzoate,
phenethyl-p-dimethylaminobenzoate,
2-phthalimidoethyl-p-dimethylaminobenzoate,
2-methacryloylethyl-p-dimethylaminobenzoate,
1,5-pentyl di-(p-dimethylamino)benzoate,
4,4'-bis(dimethylamino)benzophenone, phenethyl, and 1,5-pentyl esters of m-dimethylaminobenzoic acid,
p-dimethylaminobenzaldehyde,
2-chloro-4-dimethylaminobenzaldehyde,
p-dimethylaminoacetophenone,
p-dimethylaminobenzyl alcohol,
ethyl-(p-dimethylamino)benzoyl acetate,
p-N-piperidinoacetophenone,
4-dimethylamino benzoin,
N,N-dimethyl-p-toluidine,
N,N-diethyl-m-phenetidine,
tribenzyl amine,
dibenzylphenyl amine,
N-methyl-N-phenylbenzylamine,
p-bromo-N,N-dimethylaniline,
tridodecylamine,
4,4',4"-methylidyne,
(N,N-dimethylaniline) (crystal violet, leuco base),
3-indoleacetic acid, and
N-phenylglycine.

The coumarin associated with the amine can be one or more of, e.g., the following:
3-(2-benzofuroyl)-7-diethylaminocoumarin;
3-(2-benzofuroyl)-7-(1-pyrrolidinyl)coumarin;
7-dimethylamino-3-thenoylcoumarin;
3-benzoyl-7-diethylaminocoumarin;
3-(o-methoxybenzoyl)-diethylaminocoumarin;
3-(m-fluorosulfonyl)benzoyl-diethylaminocoumarin;
3-(p-dimethylaminobenzoyl)-diethylaminocoumarin;
3,3'-carbonylbis(5,7-di-n-propoxy coumarin);
3,3'-carbonylbis(7-diethylamino coumarin);
3-benzoyl-7-methoxycoumarin;
3-(2-furoyl)-7-diethylaminocoumarin;
3-(p-dimethylaminobenzoyl)-7-diethylaminocoumarin;
3-(p-diethylaminostyrylcarbonyl)-diethylaminocoumarin;
3-(p-morpholinostyrylcarbonyl)-diethylaminocoumarin;
9-(7-diethylamino-3-coumarinoyl)-1,2,4,5-tetrahydro-3H, 6H, 10H[1]benzopyrano[9,9a,1-gh]quinolazine-10-one and
9-(7-n-propylamino-3-coumarinoyl)-2,4,5-tetrahydro-3H, 6H, 10H[1]benzopyrano[9,9a,1-gh]quinolazine-10-one.

The photoinitiator composition can be present in an amount from 0.05 to about 10 weight percent, and preferably from 0.10 to 5 weight percent.

The composition of the invention can optionally include a variety of conventional addenda, examples of which are readily obtainable from the literature. For example, a filler can be selected to provide one or more of a variety of desirable properties to the second resist composition, such as lower cost, minimal shrinkage during cure, improved flatness, improved thermal conductivity, decreased tackiness, higher modulus, and/or the desired dielectric constant. Preferred fillers include titanox, mica particles, silica dioxide, glass beads (solid and hollow), alumina, alumina nitride, and aluminum borosilicate. The filler must not adversely affect the coatability of the resist and accordingly, is present in particles which are less than about 100 microns, preferably less than about 10 microns. Preferably from about 5 to about 10 microns in size. The filler can be present in an amount up to 80 weight percent preferably from about 10 to about 40 weight percent based on the weight of the solvent free second resist. The optimum filler loading depends of course on the particular filler selected and application and is readily determined by one skilled in the art. Particularly preferred fillers include titanox and mica particles.

The weight percents of the components of the second resist can be varied widely, based on the total weight of the solvent-free composition. The monomer noted above, can each be present in an amount from about 0.1 to about 90 weight percent, and preferably from 30 to 65 weight percent.

Inhibitors are often desirable for use with the monomers. Useful examples of inhibitors include hydroquinone, 3-t-butyl-4-hydroxy-5-methyl-phenyl sulfide, t-butylpyrocatechol and thiobis-4,4'-(2-tert-butyl-6-methylphenol).

Stabilizers, for example benzotriazole, can also be added, if desired.

The cured layer preferably has a thickness from 1 to about 250, more preferably 1.5 to 200 microns, although other thicknesses outside these ranges may also be useful in certain applications.

EXPERIMENTAL

Source of Materials

N-methylpyrrolidone (NMP), tetrahydrofuran (THF), pyridine, acetic anhydride, N,N-dimethylacetamide (DMAc), dimethoxyethane, pyromellitic dianhydride (PMDA), 3,3'-dimethoxybenzidene (DMB), 3,3'-dimethylbenzidene (DMeB), benzophenone tetracarboxylic dianhydride (BTDA), and 5-amino-(4-aminophenyl-1,1,3-trimethylindane (Nv) was obtained from Eastman Kodak Company sources. Diaminodurene (DAD) was obtained from Aldrich, $\alpha,\omega$-bis(aminopropyl)tetramethyldisiloxane (Si2) was obtained from Petrarch. 2,2-Bis(4-phthalic anhydride)hexafluoroisopropylidene (6F) was obtained from Hoechst-Celanese. The aminopropyl terminated dimethylsiloxane oligomer (Si50) was prepared in Eastman Kodak Company. The molecular weight, determined by endgroup titration. of the oligomer is 3840 g/mol, which corresponds to an average of approximately 50 dimethylsiloxane units per molecular, hence the acronym Si50.

Preparative Examples

The following preparations further illustrate the invention.

The polyimide-siloxanes were prepared by addition of an equal molar amount of the dianhydride to a solution of the diamines in tetrahydrofuran (THF) and/or N-methylpyrrolidone (NMP) at room temperature. The reaction was then stirred at room temperature overnight. To this solution, 3.5 molar equivalents of pyridine and 4.0 molar equivalents of acetic anhydride were added, and the reaction was then stirred overnight. The solution was precipitated into methanol, and the resultant fibrous polymer was chopped in a Waring blender. The polymer was then isolated by vacuum filtration, washed with methanol, and dried under vacuum at 100° C. overnight. The inherent viscosity (IV) of the polyimide was determined in N,N-dimethylacetamide at 0.5 g/dL, 25° C.

Such a procedure is illustrated by the following equation.

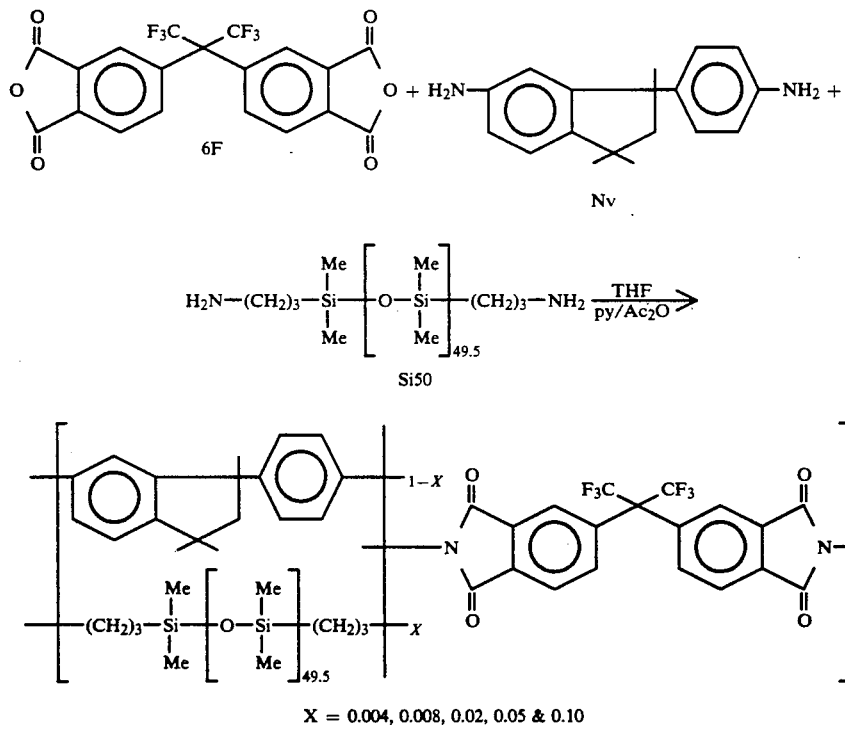

PREPARATIVE EXAMPLE 1

Nv(0.4)Si50-6F

The polyimide was prepared from 10.613 g (39.840 mmol) of 5-amino-(4-aminophenyl)-1,1,3-trimethylindane (Nv), 0.6144 g (0.1600 mmol) of aminopropyl terminated dimethylsiloxane oligomer (Si50) and 17.77 g (40.00 mmol) of 2,2-bis(4-phthalic anhydride)hexafluoroisopropylidene (6F) in 115 g of THF, imidized with 11.1 g (140 mmol) of pyridine and 16.3 g (160 mmol) of acetic anhydride yielding 27.3 g (99%) of Nv(0.4)Si50-6F, IV=0.72 dL/g.

PREPARATIVE EXAMPLE 2

Nv(0.8)Si50-6F

The polyimide was prepared from 10.570 g (39.680 mmol) of 5-amino-(4-aminophenyl)-1,1,3-trimethylindane (Nv), 1.229 g (0.3200 mmol) of aminopropyl terminated dimethylsiloxane oligomer (Si50) and 17.77 g (40.00 mmol) of 2,2-bis(4-phthalic anhydride)hexafluoroisopropylidene (6F) in 115 g of THF, imidized with 11.1 g (140 mmol) of pyridine and 16.3 g (160 mmol) of acetic anhydride yielding 27.6 g (99%) of Nv(0.8)Si50-6F, IV=0.75 dL/g.

PREPARATIVE EXAMPLE 3

Nv(2)Si50-6F

The polyimide was prepared from 10.44 g (39.20 mmol) of 5-amino-(4-aminophenyl)-1,1,3-trimethylindane (Nv), 3.072 g (0.8000 mmol) of aminopropyl terminated dimethylsiloxane oligomer (Si50) and 17.77 g (40.00 mmol) of 2,2-bis(4-phthalic anhydride)hexafluoroisopropylidene (6F) in 115 g of THF, imidized with 11.1 g (140 mmol) of pyridine and 16.3 g (160 mmol) of acetic anhydride yielding 29.0 g (99%) of Nv(2)Si50-6F, IV=0.72 dL/g.

PREPARATIVE EXAMPLE 4

Nv(5)Si50-6F

The polyimide was prepared from 10.12 g (38.00 mmol) of 5-amino-(4-aminophenyl)-1,1,3-trimethylindane (Nv), 7.680 g (2.000 mmol) of aminopropyl terminated dimethylsiloxane oligomer (Si50) and 17.77 g (40.00 mmol) of 2,2-bis(4-phthalic anhydride)hexafluoroisopropylidene (6F) in 142 g of THF, imidized with 11.1 g (140 mmol) of pyridine and 16.3 g (160 mmol) of acetic anhydride yielding 31.9 g (93%) of Nv(5)Si50-6F, IV=0.87 dL/g.

PREPARATIVE EXAMPLE 5

Nv(10)Si50-6F

The polyimide was prepared from 9.590 g (36.00 mmol) of 5-amino-(4-aminophenyl)-1,1,3-trimethylindane (Nv), 15.36 g (4.000 mmol) of aminopropyl terminated dimethylsiloxane oligomer (Si50) and 17.77 g (40.00 mmol) of 2,2-bis(4-phthalic anhydride)hexafluoroisopropylidene (6F) in 170 g of THF, imidized with 11.1 g (140 mmol) of pyridine and 16.3 g (160 mmol) of acetic anhydride yielding 39.6 g (96%) of Nv(10)Si50-6F, IV=0.53 dL/g.

EXAMPLE 1

Preparation of Nv(0.4)Si50-6F Coating

A solution was prepared containing 2.83 g of Nv(0.4)Si50-6F polyimide-siloxane, 1.2 g of tris(acryloyloxyethyl)-1,2,4-benzenetricarboxylate, 1.2 g of 1,4-cyclohexylenebis (oxyethyl) diacrylate, 0.0784 g of ethyl 4-(dimethylamino)benzoate, 0.0257 g of 3-(4-cyanobenzoyl)-5,7-dipropoxycoumarin, 0.0123 g of 4,4'-thiobis(2-methyl-6-tert-butylphenol) in 11 g of methylene chloride. The mixture was coated onto 1 oz./ft² copper on a coating block with a 12 mil blade. The coating was let stand at 25° C. for 5 minutes, then the coating block was heated to 55° C. for 10 minutes, and then subsequently was placed in a forced air oven at 90° C. for 10 minutes. The coating was covered with a 1 mil mylar sheet, which was rolled on to give intimate contact. The coating was exposed with a Colight M218 exposure unit for 120 seconds (approximately 315 mg/cm²) through an Eastman Kodak Company T-14 step tablet and standard test targets. After exposure the coatings were either allowed to stand for 15-20 minutes or were placed in a forced air oven at 90° C. for 2 minutes and then allowed to stand for 15-20 minutes and then developed with 1,1,1-trichloroethane for 2 minutes. The number of steps were determined from the T-14 step tablet and the clean out evaluated in the test patterns. The patterned coating was then heated at 200° C. in vacuum for one hour and the flatness evaluated.

EXAMPLE 2

Preparation of Nv(0.8)Si50-6F Coating

A solution was prepared containing 2.83 g of Nv(0.8)Si50-6F polyimide-siloxane, 1.2 g of tris(acryloyloxyethyl)-1,2,4-benzenetricarboxylate, 1.2 g of 1,4-cyclohexylenebis (oxyethyl) diacrylate, 0.0784 g of ethyl 4-(dimethylamino)benzoate, 0.0257 g of 3-(4-cyanobenzoyl)-5,7-dipropoxycoumarin, 0.0123 g of 4,4'-thiobis(2-methyl-6-tert-butylphenol) in 11 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour to further cure the acrylate.

EXAMPLE 3

Preparation of Nv(2)Si50-6F Coating

A solution was prepared containing 2.83 g of Nv(2)Si50-6F polyimide-siloxane, 1.2 g of tris(acryloyloxyethyl)-1,2,4-benzenetricarboxylate, 1.2 g of 1,4-cyclohexylenebis (oxyethyl) diacrylate, 0.0784 g of ethyl 4-(dimethylamino)benzoate, 0.0257 g of 3-(4-cyanobenzoyl)-5,7-dipropoxycoumarin, 0.0123 g of 4,4'-thiobis(2-methyl-6-tert-butylphenol) in 11 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour to further cure the acrylate.

EXAMPLE 4

Preparation of Nv(5)Si50-6F Coating

A solution was prepared containing 2.83 g of Nv(5)Si50-6F polyimide-siloxane, 1.2 g of tris(acryloyloxyethyl)-1,2,4-benzenetricarboxylate, 1.2 g of 1,4-cyclohexylenebis (oxyethyl) diacrylate, 0.0784 g of ethyl 4-(dimethylamino)benzoate, 0.0257 g of 3-(4-cyanobenzoyl)-5,7-dipropoxycoumarin, 0.0123 g of 4,4'-thiobis(2-methyl-6-tert-butylphenol) in 11 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour.

EXAMPLE 5

Preparation of Nv(10)Si50-6F Coating

A solution was prepared containing 2.83 g of Nv(5)Si50-6F polyimide-siloxane, 1.2 g of tris(acryloyloxyethyl)-1,2,4-benzenetricarboxylate, 1.2 g of 1,4-cyclohexylenebis (oxyethyl) diacrylate, 0.0784 g of ethyl 4-(dimethylamino)benzoate, 0.0257 g of 3-(4-cyanobenzoyl)-5,7-dipropoxycoumarin, 0.0123 g of 4,4'-thiobis(2-methyl-6-tert-butylphenol) in 11 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour.

EXAMPLE 6

Preparation of Nv(10)Si50-6F-II Coating

A solution was prepared containing 3.14 g of Nv(10)Si50-6F polyimide-siloxane, 1.57 g of tris(acryloyloxyethyl)-1,2,4-benzenetricarboxylate, 1.57 g of 1,3-bis(2-acryloyloxyethoxy)benzene, 0.0941 g of ethyl 4-(dimethylamino)benzoate, 0.0308 g of 3-(4-cyanobenzoyl)-5,7-dipropoxycoumarin, 0.0148 g of 4,4'-thiobis(2-methyl-6-tert-butylphenol) in 13.2 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour.

EXAMPLE 7

Preparation of Nv(10)Si50-6F/Mica-15% Coating

A solution was prepared containing 3.14 g of Nv(10)Si50-6F polyimide-siloxane, 1.57 g of tris(acryloyloxyethyl)-1,2,4-benzenetricarboxylate, 1.57 g of 1,3-bis(2-acryloyloxyethoxy)benzene, 0.0941 g of ethyl 4-(dimethylamino)benzoate, 0.0308 g of 3-(4-cyanobenzoyl)-5,7-dipropoxycoumarin, 0.0148 g of 4,4'-thiobis(2-methyl-6-tert-butylphenol) in 15.5 g of methylene chloride. To this solution, 1.11 g of Micro Mica 3000, a composition of mica platelets ~½ micron thick, and 5-10 microns in size, available from English Mica Co., Kings Mountain, N.C., was added and thoroughly mixed. The mixture was coated, exposed, developed, and heat-treated as described in Example 1. The mixture when coated and dried contains 15% by weight of Micro Mica. The resulting Micro Mica filled coating exhibited significantly less curl than the unfilled coatings.

EXAMPLE 8

Preparation of Nv(10)Si50-6F/Mica-30% Coating

A solution was prepared containing 3.14 g of Nv(10)Si50-6F polyimide-siloxane, 1.57 g of tris(acryloyloxyethyl)-1,2,4-benzenetricarboxylate, 1.57 g of 1,3-bis(2-acryloyloxyethoxy)benzene, 0.0941 g of ethyl 4-(dimethylamino)benzoate, 0.0308 g of 3-(4-cyanobenzoyl)-5,7-dipropoxycoumarin, 0.0148 g of 4,4'-thiobis(2-methyl-6-tert-butylphenol) in 18.8 g of methylene chloride. To this solution, 2.69 g of Micro Mica 3000 was added and thoroughly mixed. The mixture was coated, exposed, developed, and heat-treated as described in Example 1. The mixture when coated and dried contains 30% by weight of Micro Mica. The resulting 30% by weight Micro Mica filled coating exhibited significantly less curl than the unfilled coatings and 15% by weight of Micro Mica coatings.

COMPARATIVE EXAMPLE 1

Preparation of Nv(10)Si2-6F Coating

Using a synthesis procedure analogous to that given above, the polymer Nv(10)Si2-6F was prepared. Si2 is the silicon containing monomer, bis(3)-aminopropyl)-tetramethyldisiloxane. Thus, the comparative material Nv(10)Si2-6F produced contains a siloxane component with two silicons, and therefore has the short-chain type of siloxane (eight or less

linkages) suggested by Mueller. (Mueller of course does not disclose phenylindane-containing compositions). A solution was prepared containing 5.65 g of Nv(10)Si2-6F polyimide-siloxane, 2.4 g of tris(acryloyloxyethyl)-1,2,4-benzenetricarboxylate, 2.4 g of 1,4-cyclohexylenebis (oxyethyl) diacrylate, 0.1568 g of ethyl 4-(dimethylamino)benzoate, 0.0514 g of 3-(4-cyanobenzoyl)-5,7-dipropoxycoumarin, 0.0245 g of 4,4'-thiobis(2-methyl-6-tert-butylphenol) in 22 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour.

COMPARATIVE EXAMPLE 2

Preparation of Nv(20)Si2-6F Coating

A solution was prepared containing 5.65 g of Nv(20)Si2-6F polyimide-siloxane (prepared as above), 2.4 g of tris(acryloyloxyethyl)-1,2,4-benzenetricarboxylate, 2.4 g of 1,4-cyclohexylenebis (oxyethyl) diacrylate, 0.1568 g of ethyl 4-(dimethylamino) benzoate, 0.0514 g of 3-(4-cyanobenzoyl)-5,7-dipropoxycoumarin, 0.0245 g of 4,4'-thiobis (2-methyl-6-tert-butylphenol) in 22 g of methylene chloride. The mixture was coated, exposed, developed, and heat-treated as described in Example 1. The number of steps were determined from the T-14 step tablet and the clean out evaluated in the test patterns. The patterned coating was then heated at 200° C. in vacuum for one hour.

As indicated above, reduction in curl or curvature of thin-coated objects can be a requirement of good product quality, e.g., in the electronics industry. To illustrate the ability of the compositions of this invention, thin laminates of 1 oz./sq. ft. of copper were typically employed. The copper is 0.00175 in. or 0.0044 cm thick.

The laminates have a good gloss finish without surface ripple or "orange peel" on the plastic side of them, which is invariably the concave side.

A device was built to measure curl. It consisted of a plastic base (dark in color), vertical friction slide, and a plastic table on the carriage of the slide which contained a light-emitting diode (LED) in the middle of it. The table was made of clear plastic with a ground glass finish on the lower surface. The light-emitting diode was mounted so that the effective source of light is in the plane of the ground surface. A centimeter scale was cemented to the friction slide so that a pointer on the carriage indicates the distance from the table to the base.

In operation, a sample was placed on the base under the light source and the light is turned on. The light reflected from the sample was viewed from above through the table. The position of minimum width of the reflected light is found by moving the table up and down. If the sample was off center, the reflected bar of light was also off center, and the position could be corrected.

In practice, a precision of measurement of about 0.2 cm was obtained for typical specimens. It was possible to note if the sample had several zones with different curvature and separate the average curvature from the local curvatures.

It was good practice to black paint either the sides of the light-emitting diode, or the hole for it in the table, to minimize scattered light that might obscure the reflected light. A series resistor was used between the power supply and light-emitting diode to regulate the diode current.

Using the curl testing device described above, it was shown that cured compositions of this invention without a filler such as mica gave equivalent or less curl than (i) polyimides of similar structure not having siloxane in the molecule, or (ii) polyimide-siloxane of similar structure, wherein the siloxane portion of the molecule had less than eight Si—O (e.g., two) units in a chain. Furthermore, as reported in Example 2, it was also demonstrated that the siloxane modified polymers used in this invention were able to confer an even lesser amount of curl when the curable composition also contained a filler such as mica.

TABLE 1

| Polyimide | Photographic Speed* | | Curl cm$^{-1}$ |
|---|---|---|---|
| | Exposed at 35° C. | Exposed at 35° C. and Heated 2 min. at 90° C. | |
| Nv(0.4)Si50—6F | 3/7 | 6/7 | 0.83 |

TABLE 1-continued

| Polyimide | Photographic Speed* | | Curl cm$^{-1}$ |
|---|---|---|---|
| | Exposed at 35° C. | Exposed at 35° C. and Heated 2 min. at 90° C. | |
| Nv(0.8)Si50—6F | 3/6 | 5/6 | 0.71 |
| Nv(2)Si50—6F | 2/7 | 6/7 | 0.56 |
| Nv(5)Si50—6F | 2/3 | 5/7 | 0.50 |
| Nv(10)Si50—6F | 3/4 | 6/7 | 0.48 |
| Nv(10)Si2—6F | 4/7 | 6/8 | 0.77 |
| Nv(20)Si2—6F | 3/6 | 6/8 | 0.63 |

*The first number is the last solid step in the image of the T-14 Step Tablet, and the second number is the last partial step still visible (toe).

As stated above, in the cured compositions of this invention, the polymer produced on polymerization of the ethylenically unsaturated monomer, and the polyimide portion of the polyimide-siloxane are miscible. On the other hand, the siloxane portion of the polyimide-siloxane is phase separated. In this way, the compositions of this invention differ from prior art compositions having 8 or less

groups in a chain.

Dynamic mechanical analysis (DMA) of the Si2-modified polyimides, i.e., a material of the type within the prior art, shows that there is a decrease in the glass transition temperature as the concentration of the

units is increased (Table 2). Further, there is no maximum in the loss modulus near −120° C. (the glass transition temperature of the dimethylsiloxane phase) suggesting that the dimethylsiloxane groups are randomly placed within the backbone of the polymer and are not phase separated.

TABLE 2

| Polymer | Mechanical Properties of Siloxane Modified Polyimides | | | |
|---|---|---|---|---|
| | Instron | | DMA Maximum in E" (°C.) | |
| | Young's Modulus | Elongation to Break | Siloxane | Polyimide |
| Nv-6F | 3189 | 3.4 | — | 338 |
| Nv(0.4)Si50—6F | 2860 | 5.8 | −118 | 335 |
| Nv(0.8)Si50—6F | 2812 | 5.8 | −118 | 335 |
| Nv(2)Si50—6F | 2838 | 8.0 | −123 | 324 |
| Nv(5)Si50 | | | −124 | 312 |
| Nv(10)Si50—6F | 1264 | 24.0 | −132 | 258 |
| Nv(10)Si2—6F | | | * | 300 |
| Nv(20)Si2—6F | 3623 | 2.8 | * | 269 |

*not detected

In contrast, as shown by Table 2, for the Si50 modified polyimides (i.e., polyimide-siloxanes of the type used in this invention), there are two distinct maxima in E" observed. The first maxima at −120° C. is attributed to the glass transition temperature of the dimethylsiloxane phase, and the second maxima occurs at temperatures shown in Table 2. The second maxima is attributed to the Tg of the polyimide phase; however, since the Tg is lower than the Tg of the pure polyimide phase (338° C.), it suggests that there is some phase mixing occurring which results in a depression of the Tg of the polyimide phase.

Interestingly, when the physical properties of Nv(0.8)Si50-6F and Nv(20)Si2-6F, which contain the same amount of dimethylsiloxane units, are compared, the Nv(0.8)Si50-6F has twice the elongation to break, and a Young's modulus which is 25% lower than Nv(20)Si2-6F.

The good results of this invention summarized by Table 1 are generally obtainable from curable compositions (i.e., compositions cured thermally or by acteric radiation, e.g., UV radiation) comprising solvent soluble linear polyimide-siloxanes of the type described above, having about 0.5 to about 30 weight percent silicon in siloxane units having from 10, and more preferably from about 15 to 200 Si—O— linkages per unit. Preferably the ethylenically unsaturated monomer is a cyclohexyl-containing acrylate or methacrylate (herein referred to as "acrylates") of the type disclosed in U.S. Pat. No. 4,767,833.

Preferably, the relative amount of ethylenically unsaturated monomer to polyimide-siloxane is from 30 to 70 to about 30.

As shown by the Examples the curable composition may contain a filler, preferably in the amount of from about 10 to about 40 weight percent (dry weight basis) and a photoinitiator in an amount of from about 0.05 to about 10 weight percent.

The invention has been described in detail above with particular reference to preferred embodiments. A skilled practitioner, aware of the above-detailed description can make many modifications and substitutions without departing from the scope and spirit of the appended claims.

We claim:

1. A curable composition capable of forming a semi-interpenetrating network-II on curing, said composition comprising a homogeneous mixture of:
   (a) a solvent soluble linear polyimide-siloxane having from about 0.5 to about 30 weight percent silicon, said silicon being in siloxane units in said polyimide-siloxane, said siloxane units having from about 10 to about 200

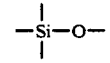

linkages per unit;
   (b) an ethylenically unsaturated multifunctional monomer;
the relative concentration of (a) and (b) being such that said mixture provides a homogeneous blend of (i) the polyimide portion of said polyimide-siloxane and (ii) the polymer produced from said monomer upon curing, in which said siloxane portion of said polyimide-siloxane is phase separated.

2. The composition of claim 1 wherein said siloxane units have from about 15 to about 200

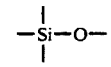

units per chain.

3. The composition of claim 2 wherein said siloxane units have from about 40 to about 60

units per chain.

4. The composition of claim 3 wherein the weight percent silicon is from about 0.05 to about 30.

5. The composition of claim 1 wherein said polyimide-siloxane has the formula:

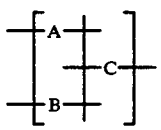

wherein A is selected from the class consisting of (i) phenylindane radicals having the structural formula:

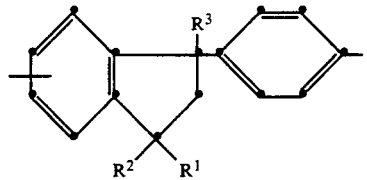

wherein $R^1$, $R^2$ and $R^3$ are individually H or an alkyl group containing from 1 to 5 carbon atoms; and (ii) groups having the structural formula:

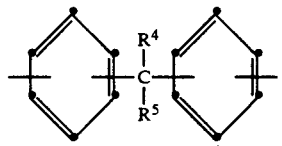

wherein $R^4$ and $R^5$ are individually H, alkyl of from 1 to 5 carbon atoms or fluoroalkyl having the formula —$(CH_2)_n$—$CF_3$ wherein n is 0–4; B is a group having the structural formula:

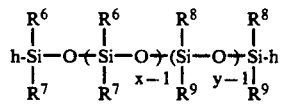

wherein h, $R^6$, $R^7$, $R^8$ and $R^9$ are selected from alkyl, and fluoroalkyl radicals of the type described above, and aryl radicals having up to about 10 carbon atoms; and C is selected from a group having the structural formula:

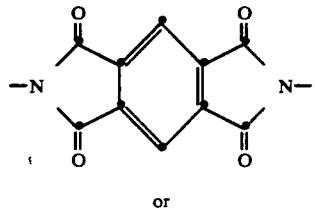

or

-continued

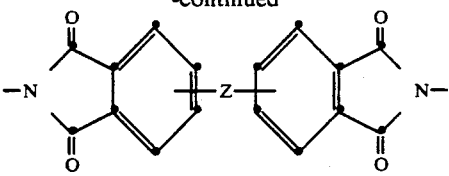

wherein Z is

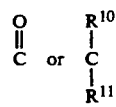

wherein $R^{10}$ and $R^{11}$ are H, alkyl or fluoroalkyl groups; said alkyl and fluoroalkyl groups being of the type described above.

6. A curable composition of claim 5 wherein A is the phenylindane radical, B is

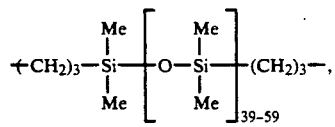

and C is

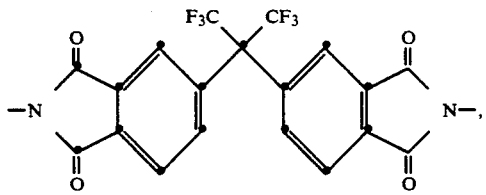

the molar proportion of A and B being from about 0.992 A to 0.008 B to 0.9 A to 0.1 B.

7. A curable composition of claim 1 wherein said monomer is selected from the class consisting of tris(a-cryloyloxyethyl-1,2,4-benzenetricarboxylate, 1,4-cyclohexylenebis(oxyethyl)diacrylate and 1,3-bis(2-acryloyloxyethoxy)benzene.

8. A composition of claim 1 wherein the relative proportion of unsaturated monomer to said polyimide-siloxane is from about 30 to 70, to about 70 to 30.

9. A composition of claim 1 wherein the molecular weight of the polyimide portion of said polyimide-siloxane is from about 40 to about 60 to from about 60 to about 40.

10. The composition of claim 8 additionally containing from about 0.05 to about 10 weight percent of a photoinitiator.

11. The composition of claim 10 additionally containing from about 10 to about 40 weight percent (on a dry weight basis) of a filler, said filler being a particulate having a particle size of from about 5 to about 10 microns.

12. The curable composition of claim 1 wherein said ethylenically unsaturated monomer has the formula:

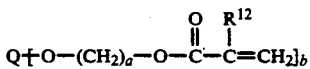

wherein
$R^{12}$ is H or $CH_3$,
a is an integer from 1 to 10, and
Q is cyclohexyl and b is 1 or 2, or Q is phenyl and b is 2 or 3.

* * * * *